Medwin

[11] 3,789,388
[45] Jan. 29, 1974

[54] APPARATUS FOR PROVIDING A PULSED LIQUID CRYSTAL DISPLAY

[75] Inventor: Albert H. Medwin, Whippany, N.J.

[73] Assignee: Ragen Semiconductor, Inc., Whippany, N.J.

[22] Filed: Mar. 17, 1972

[21] Appl. No.: 235,643

[52] U.S. Cl. .......................... 340/336, 350/160 LC
[51] Int. Cl. .................................................. G09f 9/32
[58] Field of Search..340/336, 324 R, 324 M, 166 EL; 350/160 LC

[56] References Cited
UNITED STATES PATENTS
3,653,745  4/1972  Mao .............................. 350/160 LC
3,499,112  3/1970  Heilmeier et al. ............... 340/324 M
3,505,804  4/1970  Hofstein ............................. 340/336
3,603,968  9/1971  Johnson ............................. 340/336

*Primary Examiner*—John W. Caldwell
*Assistant Examiner*—Marshall M. Curtis
*Attorney, Agent, or Firm*—Popper, Bain, Bobis, Gilfillan & Rhodes

[57] ABSTRACT

A body of liquid crystal material, normally in a transparent state whose turn-on period for changing into a light scattering state is less in duration than its decay period for returning to the transparent state, is supplied with an intermittent electric field which varies from a potential which is below the turn-on threshold potential of the liquid crystal material to a potential which is equal to or above the threshold or turn-on potential when the light scattering state is desired. The intermittent electric field is refreshed at a sufficiently rapid rate such that to the eye of a human observer the body of liquid crystal material appears to be "on" or in the light scattering state continuously.

1 Claim, 6 Drawing Figures

APPARATUS FOR PROVIDING A PULSED LIQUID CRYSTAL DISPLAY

BACKGROUND OF THE INVENTION

In the calculator art, and more particularly the miniature or "pocket" calculator art, power demands or considerations are of paramount importance. At present, the power demand of the typical prior art miniature calculator is so high that it must operate connected directly to a power line, or if it is "portable," it must use rechargeable batteries with operation limited to only a few hours between recharging. A primary contributor to such prior art power demand is the specific power demand of the visible display apparatus used in such typical prior art calculators to display mathematical calculations. Such power demand problem is also known to the clock, watch and other devive arts.

SUMMARY

The multiplexed visible display of the present invention is a general purpose display which may be beneficially utilized to display virtually any information and is particularly useful as a display wherein minimized power demand or long battery life are particularly significant. By being multiplexed, the visible display of the present invention can perform some 2,000 hours before replacement of "throw-away" batteries is required. In addition, when the present invention is used with a miniature calculator, the logic required for decoding the binary coded decimal information to seven-segment display patterns is reduced, since one decoder can be "time-shared" by all eight digits of the calculator. If multiplexing were not performed, a total of eight separate decoders would be required (needing 500 more transistors in the logic of the calculator). Similarly, the number of leads from the liquid crystal display to the logic package is reduced from 65 to 20, which represents a considerable saving in packaging cost and complexity. Such multiplexing is accomplished by intermittently and repetitiously establishing a predetermined electric field across a body of liquid crystal material at a predetermined rate such that the period of time elapsed between consecutively established fields does not exceed the duration of the decay period during which the liquid crystal material returns to the transparent state from the light scattering state produced by the electric fields.

DETAILED DESCRIPTION OF THE INVENTION

Figure 1:
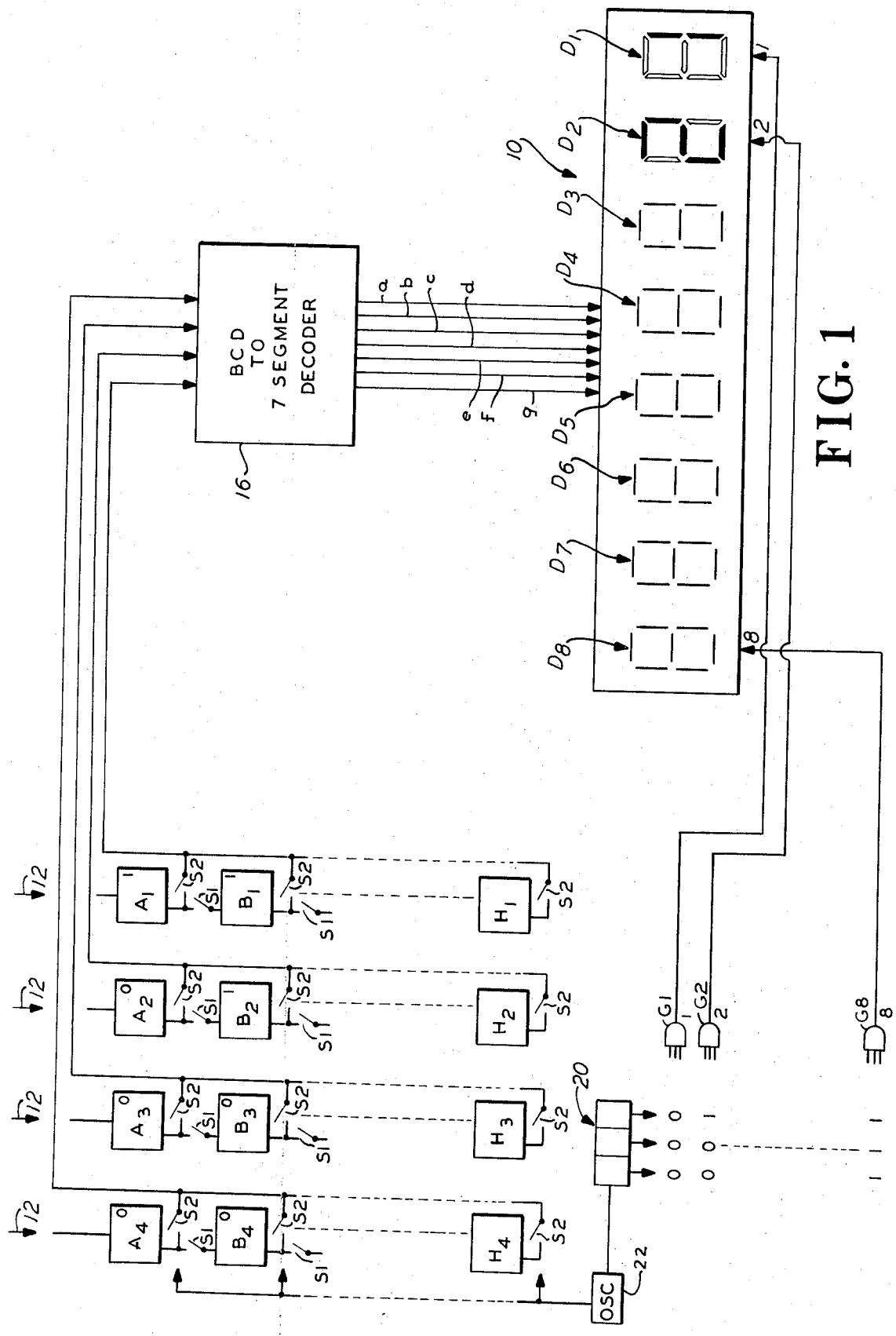
FIG. 1 is an overall diagrammatic representation of an embodiment of the present invention as embodied as the visible display of a "pocket calculator;"

Referring now to FIG. 1 there is shown apparatus for providing a visible display according to the present invention which apparatus as shown in FIG. 1 is embodied as the visible display apparatus of a calculator. More particularly, there is shown a display panel 10 including a plurality of individual digits, or digit displays, D1 . . . D8 useful, for example, for providing a visible display of the intermediate and final mathematical calculations of a calculator. A plurality of alphabetically designated (A . . . H) multi-stage shift registers, equal in number to the display digits D1 . . . D8, are shown for receiving and storing signals or information from the arithmetic portion of a calculator (not shown), such signals or information being indicated by arrows 12. The registers include four stages and may be any suitable shift register known to the art, and in the manner known to those skilled in the art, upon the suitable closure of the shift switches 52, the information represented by arrows 12 is shifted in parallel into and stored by the registers. The information stored in the shift registers A . . . H is stored as four bit binary coded decimal information and upon the suitable sequential closure of the read-out switches S2 of the respective registers, the switches S2 of each register being closed simultaneously, the information stored in each register is fed in parallel into a suitable binary coded decimal (BCD) to seven segment decoder 16 of the type known to those skilled in the art. The output of the decoder 16 is seven bit binary coded decimal information in electrical signal or pulse form, which is applied in parallel to the digit displays D1 . . . D8 in the manner set forth in detail below.

Also shown in FIG. 1 is a suitable counter 20 whose output is a parallel, three bit binary coded output, as shown which is applied to suitable gates G1 . . . G8 equal in number to the shift registers A . . . H, and the digit displays D1 . . . D8, namely eight in number. The counter 20 counts from one to eight repetitiously and the gates G1 . . . G8 are suitably activated in sequence, in the manner known to those skilled in the art, to provide sequential electrical signals or pulses to the digit displays D1 . . . D8 in a manner set forth in detail below.

In a manner shown to those skilled in the art, an oscillator, or clock oscillator 22 is provided to control the time relationship between the electrical signals or pulses applied to the digit displays D1 . . . D8 by the shift registers A . . . H and binary coded decimal to seven segment decoder 16, and the electrical signals or pulses provided by the gates G1 . . . G8, by suitably controlling, through suitable circuitry not shown. the closure of the read-out switches S2 and the operation of the counter 20 and gates G1 . . . G8.

Referring again to the display panel 10, and the display digits D1 . . . D8, and in particular to FIG. 2, the display panel 10 includes a pair of spaced apart layers of glass 26 and 28 between which is suitably sealed a body of suitable liquid crystal material 30 such as a suitable body of nematic liquid crystal material.

In the manner shown to those skilled in the art, liquid crystal material has the ability to appear transparent or to reflect ambient or incident light; this characteristic can be controlled by the application and removal of a suitable electric field which causes a small ionic current to flow, the potential for establishing such electric field being known as the threshold voltage or potential. More particularly, the liquid crystal material is normally in the transparent state and upon the application thereacross of a potential which is at least equal to, or above the threshold potential which will establish an electric field sufficiently strong to cause the liquid crystal material to change into the light scattering state, the liquid crystal material changes into the light scattering state and reflects ambient or incident light and thereby provides a visible display. Various liquid crystals or liquid crystal materials are known which have a difference between the amount of time it takes to cause the material to change from the transparent to the light scattering state upon the application of an electric field thereacross, i.e., its "turn-on" period, and the amount of time it takes for the liquid crystal material to return from the light scattering state to the transparent state upon the removal of the electric field, i.e., its "decay" period. For example, one known, commercially available liquid crystal has a turn-on period of 10 milliseconds and a decay period of over 100 milliseconds or of approximately 115 milliseconds. In accordance with the teaching of the present invention it has been found that the difference between turn-on and decay periods can be utilized to permit the liquid crystal to be multiplexed. Further, it has been found that improved multiplexing results can be obtained if the applied potential or electric field is merely decreased below the threshold potential of the liquid crystal material and is not completely removed from the liquid crystal and the liquid crystal material is not permitted to return to its fully relaxed state or condition or upon the complete removal of the electric field. More particularly, it has been found that upon the application of a suitable voltage intermediate zero and the threshold voltage for establishing the electric field across the liquid crystal material for causing the change into the light scattering state, the liquid crystal material remains in the transparent state and does not fully relax, for example, it has been found that an intermediate voltage equal to one-half the threshold voltage for producing the electric field for producing light scattering provides improved and satisfactory results.

Figure 4:
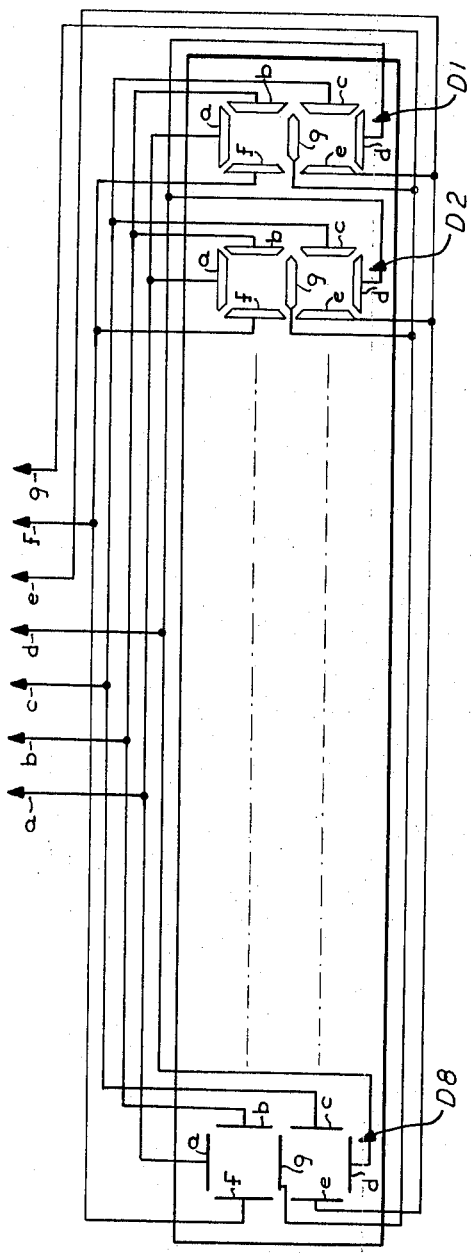
FIG. 4 is a diagrammatic representation illustrating the electrical interconnections of the digit segments and the relationship of the digit segments to the sectors.
Figure 2:
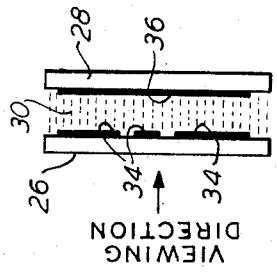
FIG. 2 is a diagrammatic representation of an end-view of a display panel.

The electric fields may be established across the body of liquid crystal or liquid crystal material 30 in FIG. 2 by transparent electrodes 34 formed on glass layer 26 and the reflecting electrode 36 formed on glass layer 28; the liquid crystal 30 being in intimate electrical and mechanical engagement with the electrodes as shown. The electrodes may be formed on the glass layers by evaporation or sputtering or may be produced by photo-masking or etching techniques known to the art. With regard to the viewing direction indicated in FIG. 2, the electrodes 34 are transparent (e.g., indium oxide) and the electrode 36 is a reflecting electrode (e.g., aluminum). As may be best seen in FIG. 4, each of the digit displays D1 . . . D8 may include a plurality of transparent electrodes arranged in a predetermined configuration or pattern such as the seven segment arrangement shown in the upper half of FIG. 4, and an associated transparent or sector reflecting electrode identified numerically 1 . . . 8, as shown in the lower portion or half of FIG. 4, and a predetermined portion of the liquid crystal material 30 disposed or residing between the transparent and reflecting electrodes.

Figure 3:
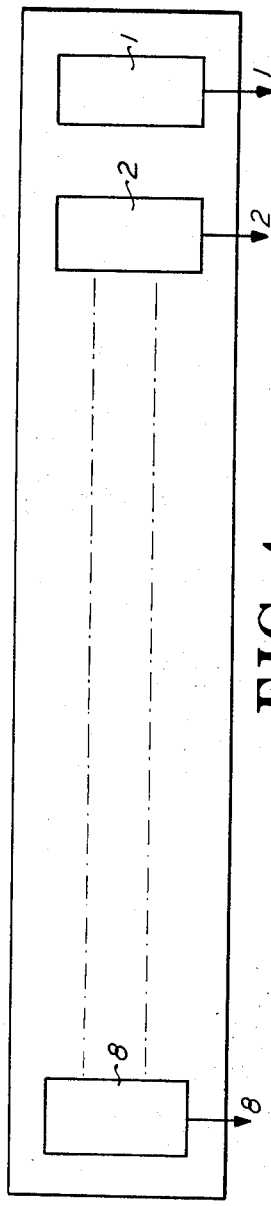
FIG. 3 is a diagrammatic representation showing the alphabetical designations of the segments of the digits for displaying information.
Figure 3:
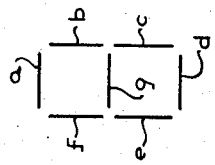

As illustrated in FIG. 3, each group of seven segment reflecting electrodes of each display digit may be provided with alphabetical designations $a \ldots g$ as shown, and in accordance with the teaching of the present invention the corresponding alphabetically identified transparent electrodes, or segments, of each display digit D1 . . . D8 are electrically interconnected as shown in the upper portion of FIG. 4; the reflecting sector electrodes 1 . . . 8 are physically and electrically distinct and are not interconnected.

Figure 5:
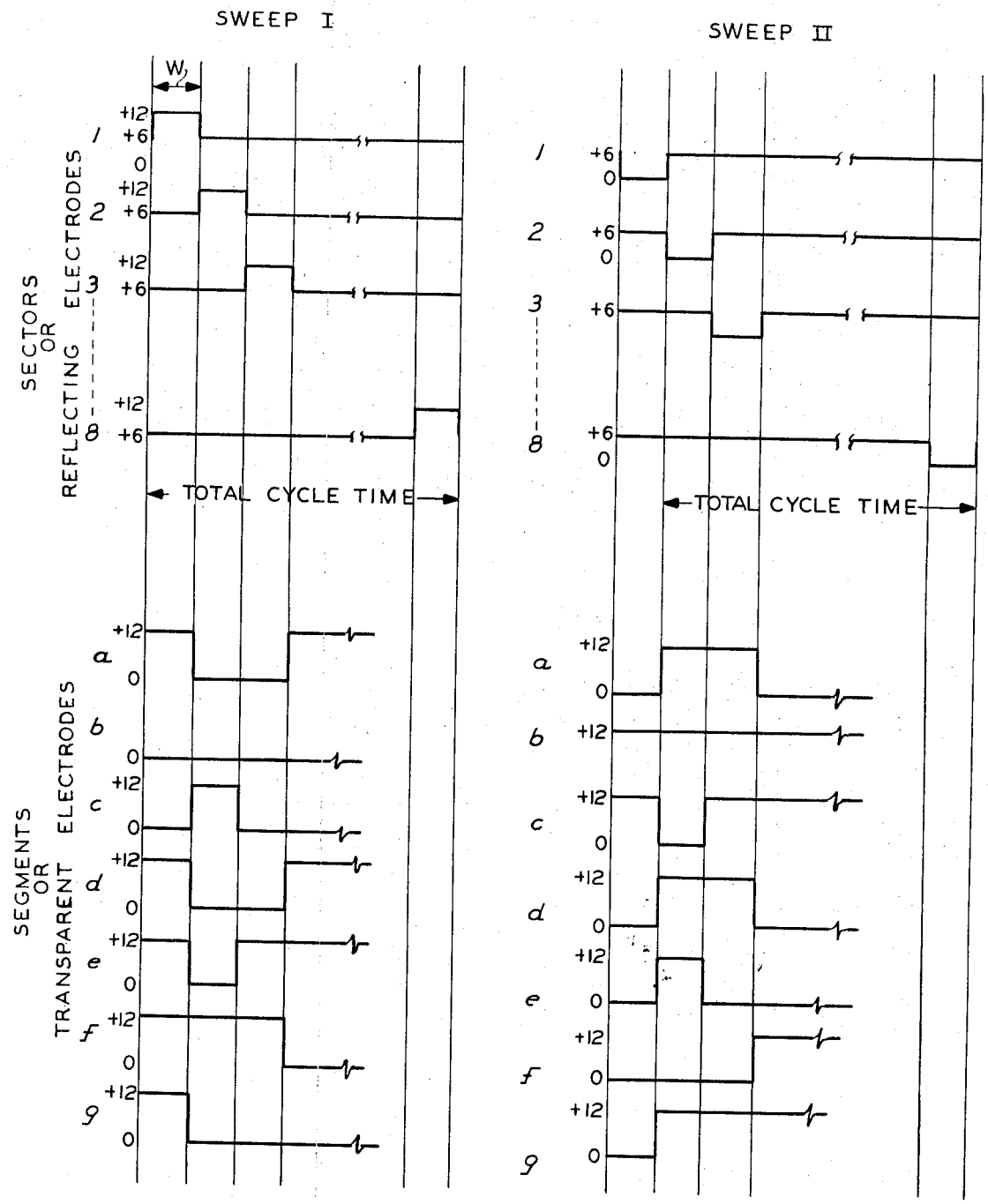
FIG. 5 is a timing diagram illustrating the time relationship of the signals or pulses applied to the segments and sectors.

It will now be assumed that the numbers or digits 1 and 2 have been stored in the stages of the A and B shift registers of FIG. 1 in binary coded form 0001 and 0010 as shown the stages A1 . . . A4 of register A and the stages B1 . . . B4 of register B, respectively. It will be understood that the stored numbers or digits are to be visibly displayed by the display digits D1 and D2 of FIGS. 1 and 2 reading from right to left. In response to a predetermined pulse from the clock-oscillator 22 and during sweep I, the counter 20 will be operated to provide a three bit binary output count (000) which will activate gate G1 to apply an electrical signal or pulse to only the reflecting electrode or sector 1, and simultaneously, the read-out switches 52 of register A will be closed to read-out the stored 4 bit binary coded number 1 in parallel into the binary coded decimal to seven digit decoder 16 which will decode or translate the four bit binary coded 1 into a corresponding seven bit binary coded decimal or number and will apply the corresponding seven bit binary number in parallel and in electrical signal or pulse form to all the appropriate electrically interconnected, alphabetically identified transparent electrodes. More particularly, to visibly display the number 1 in digit display D1 of FIG. 1, the transparent electrodes $b$ and $c$ (FIG. 3) must be "turned on," accordingly, as shown in FIG. 5, during the first time interval, reflecting electrode or sector 1 has a pluse of +12 volts applied thereto by gate G1 while the gates G2 . . . 8 apply a + 6 volt pulse to all of the other reflecting electrodes or sectors 2 . . . 8, simultaneously as shown in FIG. 5, the decoder 16 applies a zero volt pulse in parallel to all the transparent eletrodes or segments $b$ and $c$ and applies a +12 volt pulse in parallel to the segments $a, d, e, f$ and $g$. Thus, the segments or transparent electrodes $b$ and $c$ and the reflecting or sector electrode 1 of digit display D1 will have a 12 volt potential or difference therebetween which potential is at least equal to the threshold voltage and hence is sufficiently great to establish an electric field across those portions of the liquid crystal material 30 (FIG. 2) disposed between the reflecting electrodes or segments $b$ and $c$ and the reflecting electrode or sector 1 to cause such portions of liquid crystal material to change from the transparent to the light scattering state thereby reflecting incident or ambient light, as shown in solid outline in FIG. 1, and thereby provide a visible display of the number 1 in digit display D1. It will be noted that the transparent electrodes or segments $a, d, e, f$ and $g$ and the reflecting electrode or sector 1 of digit display D1 will only have a 6 volt potential or difference therebetween which is below threshold voltage and hence is not sufficient to establish an electric field across the liquid crystal material disposed therebetween sufficiently great to change such liquid crystal material into the light scattering state; hence, segments $b$ and $c$ of digit display D1 will be turned "on," and all other segments will be turned "off." It will be further noted and understood, and in accordance with the teaching of the present invention, that although the zero pulse is applied to all of the reflecting electrodes or segments b and c of all of the digit displays D1 ... D8, the segments b and c of digit displays D2 ... D8 will not be turned "on" because the reflecting electrodes or sectors of digit displays D2 ... D8 have a +6 volts applied thereto and hence the 6 volt potential or difference therebetween is below threshold potential and hence will not be sufficiently great to produce light scattering of the liquid crystal disposed between such electrodes.

During the next interval of time during sweep I, and in response to an output signal from a clock oscillator 20, a +12 volt pulse will be applied to the reflecting electrode or sector 2 of digit display D2, and coincidentally therewith, the number 2 will be read out of the B register and the decoder 16 will apply a zero pulse in parallel to all the reflecting electrodes or segments a, b, d, e and g, in the manner taught above, the portions of liquid crystal material 30 disposed between such electrodes will be changed into the light scattering state to turn "on" segments a, b, d, e and g to visibly display the number 2 in digit display D2.

Similarly, any other numbers stored in the stages of shift registers C ... H would be visibly displayed in digit displays D2 ...D8, respectively.

It will be understood, and as shown with regard to sector 1 in sweep I of FIG. 5, the width of the pulses applied to the transparent electrodes or segments, and the pulses applied to the reflecting electrodes or sectors, is greater in duration than the above-mentioned turn-on period for the liquid crystal material, thereby assuring complete "turn-on" of the intended segments. Also, it will be understood, and as shown in FIG. 5, the pulse repetition rate of the pulses applied to the transparent electrodes or segments and the reflecting electrodes or sectors, is sufficiently fast that the total cycle time of the pulses is not greater in duration than the above-mentioned decay period of the liquid crystal material, hence, the segments of the digit displays which have been "turn-on" to visibly display the numbers as described above, are "refreshed" by the above-described multiplexing teaching of the present invention at a sufficiently fast rate such that to the eye of a human observer, such segments appear to be "on" continuously. Such multiplexing significantly reduces the number of leads to the display (16 instead of 65) and the number of decoders (1 instead of 8) and hence reduces the power demand of the display.

Referring again to the pulse diagrams of FIG. 5, it will be noted that during sweep I, the pulses applied to the reflecting electrodes or sectors 1 ... 8 vary between a +6 volts and a +12 volts, and that the pulses applied to the transparent electrodes or segments vary between +12 volts and zero volts, and that the potential difference across the portions of the liquid crystal material disposed between the electrodes seldom drops to zero---such potential difference normally alternating between 12 and 6 volts. Therefore the total relaxation of the liquid crystal material is minimized thereby contributing to the lower power demand of the visible display apparatus of the present invention.

Figure 6:
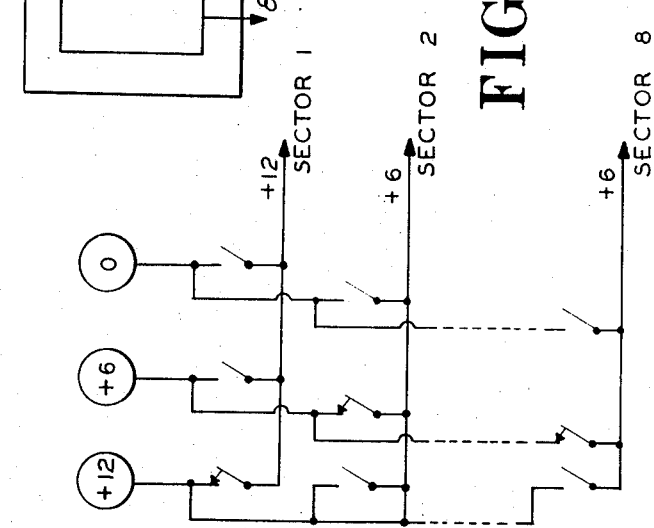
FIG. 6 is a diagrammatic representation illustrating circuitry useful for producing the signals or pulses of FIG. 5.

Further, and referring still to FIG. 5, since ionic current would tend to "plate out" one electrode if the activating potential were continually applied in one direction, such flow is alternated by reversing the electric field in alternate sweeps by reversing the voltages of the pulses applied to the electrodes, for example, note the reversal of potentials of the pulses in sweeps I and II as shown in FIG. 5. Suitable circuitry for providing the pulses to the reflecting electrodes or sectors 1 ... 8 is shown diagrammatically in FIG. 6; upon the suitable closure of the switches, a pulse of either +12, +6 or zero volts may be applied sequentially to the sectors 1 ... 8. Similarly, suitable circuitry may be utilized to apply pulses of +12 or zero volts to the transparent electrodes or segments.

It will be further understood by those skilled in the art that many modifications and variations may be made in the present invention without departing from the spirit and scope thereof.

What is claimed is:

1. Apparatus for providing a visible display, comprising:

a plurality of reflecting electrodes;

a plurality of groups of transparent electrodes, each group of said transparent electrodes being displaced from and disposed opposite one of said reflecting electrodes and being arranged in a predetermined configuration and said transparent electrodes in each group similarly arranged being electrically interconnected in parallel;

a body of liquid crystal material disposed and sealed between and in engagement with said reflecting electrodes and said groups of transparent electrodes, said body of liquid crystal material normally in a fully relaxed condition and in a transparent state and upon a full strength electric field being applied thereto said liquid crystal material changing during a turn-on period into a full light scattering state and scattering incident light and thereby providing said visible display, upon a zero strength electric field being applied thereto after said full strength electric field is applied thereto and removed therefrom said liquid crystal material returning during a decay period greater in duration than said turn-on period to said fully relaxed condition and said transparent state, and upon an intermediate strength electric field being applied thereto after said full strength electric field is applied thereto and removed therefrom said liquid crystal material returning to said transparent state during said decay period but only partially returning to said fully relaxed condition;

first pulse applying means for applying a first electrical pulse at a first voltage level sequentially to each one of said reflecting electrodes in a first predetermined sequence, and said first pulse applying means for applying second electrical pulses at a second voltage level simultaneously to all other reflecting electrodes while said first electrical pulse is applied to any one of said reflecting electrodes;

second pulse applying means for applying a third electrical pulse at a third voltage level in parallel to predetermined ones of said transparent electrodes in a second predetermined sequence and for applying a fourth electric pulse at said first voltage level in parallel to all other transparent electrodes while said third electric pulse is applied in parallel to said predetermined transparent electrodes;

controlling means for operating said first and said second pulse applying means to cause said first applying means to apply said first electrical pulse to a predetermined one of said reflecting electrodes in said first predetermined sequence and to apply said second electrical pulses simultaneously to all other reflecting electrodes and to cause said second pulse applying means to coincidentally apply said third electrical pulse in parallel in said second predetermined sequence to predetermined ones of said transparent electrodes and to apply said fourth electrical pulse simultaneously in parallel to all other of said transparent electrodes whereby (i) said full strength electric field is applied across first predetermined portions of said body of liquid crystal material disposed between and in engagement with said predetermined one of said reflecting electrodes and said predetermined ones of said transparent electrodes opposite said predetermined ones of said reflecting electrodes, (ii) said zero strength electric field is applied across second predetermined portions of said body of liquid crystal material disposed between and in engagement with said predetermined one of said reflecting electrodes and said all other of said transparent electrodes opposite said predetermined one of said reflecting electrodes, and (iii) said intermediate strength electric field is applied across third predetermined portions of said body of liquid crystal material disposed between said all other reflecting electrodes other than said predetermined one of said reflecting electrodes and said groups of transparent electrodes opposite said all other reflecting electrodes, and said controlling means for operating said first and said second pulse applying means to cause said first pulse applying means to apply said first electrical pulse in said first predetermined sequence to said reflecting electrodes at a predetermined pulse repetition rate such that said first electrical pulse is applied to all of said reflecting electrodes in said first predetermined sequence in a period of time not greater than said decay period of said liquid crystal material and to cause said second pulse applying means to coincidentally apply said third and said fourth electrical pulses simultaneously in parallel to said predetermined ones of said transparent electrodes and said other transparent electrodes at said predetermined pulse repetition rate.

* * * * *